2,944,046

PROCESS FOR THE PRODUCTION AND USE OF NOVEL TANNING AGENTS AND PRODUCTS PRODUCED BY SUCH PROCESS

Lucien Sellet, Saddle River, N.J., assignor to Jacques Wolf & Co., a corporation of New Jersey No Drawing. Filed Sept. 23, 1952, Ser. No. 311,149

26 Claims. (Cl. 260—67.6)

The present invention relates to novel modified amino-formaldehyde resins and the process for producing them. The invention also includes a novel method for the treatment of materials, penetratable or porous in nature, with said modified amino-formaldehyde resins in combination with water soluble or water dispersable high molecular weight organic compounds containing at least one sulfo group, and novel products produced by said method, said method and products being of particular importance in the leather industry.

Objects and advantages of the invention will be set forth in part hereinafter and in part will be obvious herefrom, or may be learned by practice with the invention, the same being realized and attained by means of the steps and compositions pointed out in the appended claims.

The invention consists in the novel steps and compositions herein shown and described.

An object of my invention is to produce modified amino-formaldehyde resin, which is stable in water and possesses cation active properties, by reacting an amino-formaldehyde resin having at least one reactive hydroxy group with an amino compound having at least one functional amino group whereby a condensation reaction takes place by the reaction of the hydroxy and amino groups.

Another object of my invention is to provide a novel method for treating materials, penetratable or porous in nature, and in particular leather compositions, comprising dispersing a modified amino-formaldehyde resin and a high molecular weight sulfo compound on said object being treated and providing an acidic environment whereby said sulfo compound and amino-formaldehyde resin react so as to form a water insoluble addition compound which remains fixed to the object being treated.

A still further object of my invention is to provide novel coated materials formed in accordance with the process described in the above paragraph.

The term "amino-formaldehyde resins" as used throughout the present specification, refers to the well known water soluble or water dispersable resins formed by the condensation of an amino compound having functional amino groups with suitable amounts of an aldehyde, preferably formaldehyde, with or without a catalyst, at temperatures generally above room temperature. Also, the term "amino-formaldehyde resin" as used hereinafter is meant to include a resin produced in accordance with the conventional process described above, and whose chemical structure contains at least one reactive hydroxy group.

One of the great drawbacks in commercial application of the above described amino-formaldehyde resins is their limited stability in water due to the presence of a hydroxy group or groups which encourage condensation or polymerization of the resins when in an aqueous medium. For example, in the tanning industry, the lack of stability and the subsequent change in physical and chemical properties of these resins when in water solutions, seriously detract from the use of said amino-formaldehyde resins as tanning agents. In many cases, these resins produce undesirable side effects which are difficult to control and often can not be controlled at all. It is well known, for instance, that some of these resins during application to leather are lacking the right penetration and cause crackiness of the treated leather. In other cases, the tensile strength of the treated leather is sometimes considerably lowered.

In order to produce water soluble or water dispersable resins which have all the desirable properties of the well known amino-formaldehyde resins but which are far more stable when in an aqueous medium, I have invented a novel process which I consider to be quite important in the resin field.

My novel process in general consists in reacting an aminoplast resin having at least one reactive hydroxy group with an amino compound having at least one functional amino group to form a condensation product which is stable in water solution and will not polymerize or condense therein and which has cation active properties.

More particularly, my invention relates to a process for modifying the amino-formaldehyde resins which have been prepared by the condensation of at least one mole of formaldehyde with an amino compound of the type illustrated by urea, thiourea, guanidine, acetylene diurea, melamine and dicyandiamide. These amino-formaldehyde resins contain at least one reactive methylol group which limits the stability of these resins since they tend to polymerize or condense when in an aqueous medium.

By reacting one of the above referred to amino-formaldehyde resins with an appropriate amount of an amino compound of the type illustrated by urea, dicyandiamide, guanidine, thiourea, acetylene diurea and melamine, a condensation reaction takes place, whereby preferably all of the reactive methylol groups are eliminated, thus providing a modified amino-formaldehyde resin which is highly stable in an aqueous medium.

The molar proportion of amino compound which is reacted with the amino-formaldehyde resin will obviously vary depending upon the number of reactive hydroxy groups in a mole of the amino-formaldehyde resin as well as the number of functional amino groups in the amino compound. The proportions should be such that all of the reactive hydroxy groups in the amino-formaldehyde resin are eliminated by reaction with an equal number of functional amino groups in the amino compound. Hence, the amount of a specific amino compound which would be reacted with a particular amino-formaldehyde resin would well be within the skill of one in the field in view of the above description.

The reaction is preferably carried out at temperatures between the range of 75° C. to 110° C. Also, the time of the reaction will vary in different cases, the time being usually in the range of about 3 to about 10 hours. As is well known, the time may be decreased by increasing the temperature and vice versa. The pH of the reaction medium is preferably slightly acid, neutral or slightly alkaline in nature. Preferably, an alkaline catalyst such as borax is used to speed up the reaction.

Advantageously, the modified amino-formaldehyde resins produced in accordance with my process are water soluble or water dispersible and maintain their stability in water. They have very good penetrating properties which make them very useful as fillers in treating materials, penetratable or porous in nature, such as leather, paper, fabrics, etc. A water solution or dispersion of said resin is applied to said porous or penetratable material whereby said resin adheres to said material and fills the pores thus producing a smooth finish to said material.

One of the outstanding uses of my novel cation active modified amino-formaldehyde resins is their use in combination with an anion active water soluble or water dispersible high molecular weight organic compound containing one or more sulfo groups, the sulfo compound either being in the form of a neutral salt or in the form of a compound having a free sulfo group, for the treatment of leather compositions.

According to the last mentioned aspect of my invention, the modified amino-formaldehyde resin and sulfo compound are dispersed on the leather by means of an aqueous bath whereby they react under acidic conditions to form a water insoluble compound which improves the tensile strength, flexibility, resistance to cracking and resistance to abrasion of the treated leather.

Hence, if the sulfo compound is in the form of a neutral salt, the sulfo compound and modified amino-formaldehyde resin are put in an aqueous bath and the leather is treated with said bath for a sufficient period of time, usually three or four hours, until the sulfo compound and modified amino-formaldehyde resin have had time to be absorbed by the leather. Of course, either the modified amino-formaldehyde resin or sulfo compound may be dispersed on the leather alternatively instead of simultaneously if so desired, but it is advantageous to treat the leather simultaneously for the time of treatment is shortened. When both the neutral salt of the sulfo compound and the modified amino-formaldehyde resin have been absorbed by the leather, an acidic compound, such as sulfuric acid, citric acid, lactic acid, diglycolic acid, etc. or an acidic salt such as aluminum sulfate, aluminum chloride, sodium bisulfate is added to the bath to bring the pH of the bath to a definite acidic environment, for example a pH of about 3 or 4, whereupon the sulfo compound and modified amino-formaldehyde resin react forming a water insoluble compound which remains fixed to the leather.

When a sulfo compound is used which has a free sulfo group so as to be acidic in nature, the sulfo compound and modified amino-formaldehyde resin can not be added to the bath simultaneously since due to the acidic nature of the sulfo compound, a reaction would take place immediately, whereby a water insoluble compound would be formed in the bath, and a sufficient amount of said compound would not be absorbed by the leather. Hence, when a sulfo compound having the sulfo group in the free state is used, the leather must be treated with either the sulfo compound or modified amino-formaldehyde resin first, and subsequently with the other, but not simultaneously.

Illustrative examples of sulfo compounds which may be used are lignin sulfonate and its neutral salts such as sodium sulfo lignin and magnesium sulfo lignin; vegetable tannins such as wattle extract solubilized by sodium bisulfite as well as quebracho extract solubilized by sodium bisulfite and the neutral water soluble salts of these extracts produced by neutralizing each of these extracts with a base such as sodium hydroxide, ammonium hydroxide and potassium hydroxide; synthetic tannins known as exchange tannins, having at least one sulfo radical. Included in these exchange tannins are both the acid tannins having a free sulfo group as well as the water soluble salts such as the sodium salts.

The above exchange tannins, preferably include the tannins formed by joining two moles of compounds such as phenol, cresol, xylenol, naphthol, catechol, resorcinol, naphthalene, anthracene and benzidine with a methylene, sulfone, propane or sulfonimid bridge. At least one mole of the phenol, cresol etc. compounds contain a sulfo group. Illustrative examples of these compounds are: disulfo dinaphthol methane, disulfo dinaphthyl methane, monosulfo dihydroxy diphenyl methane, a complex reaction product formed by reacting monosulfo dihydroxy methane with formaldehyde to give the formula:

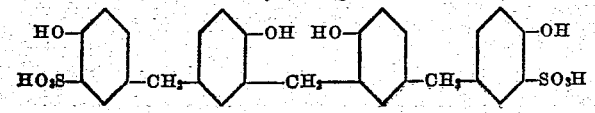

Omega sulfonate of dihydroxy dimethyl diphenyl sulfone, omega sulfonate of dihydroxy diphenyl sulfone, omega sulfonate of dihydroxy diphenyl propane, disulfo dihydroxy diphenyl propane, disulfo dihydroxy diphenyl sulfone, and complex compounds containing a benzidine radical with a sulfonimid bridge as illustrated by the following compound:

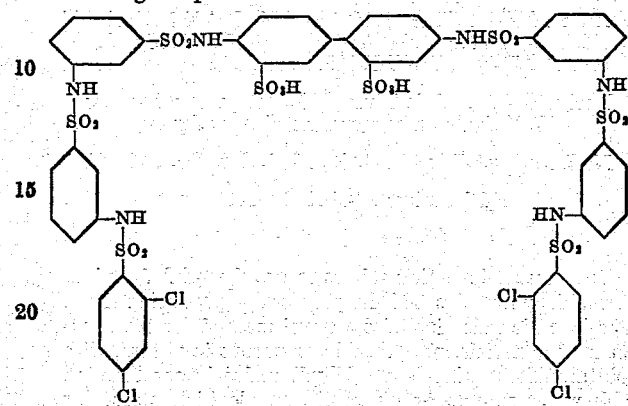

The water soluble salts of these compounds are also operable such as the sodium, potassium and ammonium salts as illustrated by the sodium salt of disulfo dinaphthyl methane, the sodium salt of disulfo dihydroxy diphenyl propane and the sodium salt of disulfo dihydroxy diphenyl sulfone.

In order to illustrate the invention by working examples the following examples are now given. Examples 1–16 are directed to the preparation of modified amino-formaldehyde resins in accordance with my present invention. If so desired the modified amino-formaldehyde resins may be prepared in the presence of an anionic active sulfo compound which is neutral as illustrated by Examples 17–22. This is advantageous for the modified amino-formaldehyde resin which is formed and the sulfo compound are already combined and may immediately be dispersed in an aqueous bath for treatment of leather in a manner hereinafter described in detail. Examples 23 to 34 are directed to the manner of treating leather with the modified amino-formaldehyde resins and high molecular weight sulfo compounds in accordance with the present invention.

*Example I*

180 grms. guanidine carbonate and 243 grms. formaldehyde 37% are mixed together in a flask equipped with reflux and refluxed at a temperature of 80° C. for 1 hour. 168 grms. dicyandiamide are then added and the mixture is refluxed at 80° C. for 6 hours, the pH of the final reaction product being about 10.5.

*Example II*

180 grms. guanidine carbonate and 243 grms. formaldehyde 37% are heated together in a flask equipped with reflux, the temperature being brought to 80°–90° for one hour. 126 grms. of melamine are added and the mixture is heated and refluxed 4 hours at 95° C., the pH of the final reaction product being about 10.3.

*Example III*

180 grms. guanidine carbonate and 243 grms. formaldehyde 37% are heated together in a flask equipped with reflux, at a temperature from 80° to 90° C. for 1 hour. 228 grms. thiourea are then added and the mixture is heated and refluxed for 4 hours at 90° C., the pH of the final reaction product being about 9.8.

*Example IV*

180 grms. guanidine carbonate and 243 grms. formaldehyde 37% are heated together in a flask equipped with reflux, the temperature being brought to 80° to 90° C. for 1 hour. 180 grms. urea are then added and the mixture is heated and refluxed for 4 hours at 90° C., the pH of the final reaction product being about 9.9.

Example V 126 grms. melamine and 489 grms. formaldehyde 37% are heated together in a three neck flask equipped with reflux and the temperature is raised to 80° C. for ½ hour. 360 grms. of guanidine carbonate are then added and the mixture is heated and refluxed for 5 hours at 95° C., the pH of the final reaction product being about 9.5.

Example VI 60 grms. urea and 162 grms. formaldehyde 37% are heated together in a flask equipped with a reflux condenser. The temperature is brought to 80° C. for 1½ hours. 360 grms. guanidine carbonate and 200 cc. water are then added and the mixture is heated and refluxed for 5 hrs. at 80° C., the pH of the final reaction product being about 10.2.

Example VII 120 grms. urea, 648 grms. formaldehyde 37% and 3.8 grms. borax are heated together in flask equipped with a condenser, at a temperature of 80° C. for 1½ hours. 84 grms. dicyandiamide are then added and the mixture is heated and refluxed for three hours at 80° C. To this product which has no cation active properties are added 84 grms. dicyandiamide and the heating is continued for 4 hours at 95° C., the pH of the final reaction product being 9.0.

Example VIII 142 grms. acetylene di-urea, 324 grms. formaldehyde 37% and 1.4 grms. borax are heated together in a flask equipped with reflux, the temperature being brought to 95° C. for 4 hours. 180 grms. guanidine carbonate are added and heated and refluxed for 2 hours at 95° C., the pH of the final reaction product being 10.3.

Example IX 142 grms. acetylene di-urea and 324 grms. formaldehyde 37% are added together in a flask equipped with reflux and 2 grms. NaOH 40° Bé are added to bring pH of mixture to 10–12.

The product is agitated for ½ hour until solution is clear at a temperature 50° to 60° C. 63 grms. melamine are then added and the mixture is heated and refluxed for 2 hrs. at 95° C. 168 grms. dicyandiamide are added and the mixture refluxed for 2 hours at 95° C. The pH of the final reaction product being about 9.0.

Example X 284 grms. acetylene di-urea, 652 grms. formaldehyde 37% and 1.25 grms. borax are mixed in a flask and refluxed for 4 hours at 85° C. under stirring.

470 grms. of the final product formed above are mixed with 168 grms. dicyandiamide. This mixture is heated and refluxed for 11 hours in a flask equipped with a reflux. Keeping temperature at 95° C., the pH of the final reaction product being 8.1.

Example XI 1 mol 84 grms. dicyandiamide, 4 mol 324 grms. formaldehyde 37% and 1.2 grms. borax are mixed in a flask and heated and refluxed for 4 hrs. at 95° C.

142 grms. di-acetylene urea powder are added and the mixture is heated and refluxed for 10 hrs. at 95° C., the pH of the final reaction product being about 8.5.

Example XII 168 grms. dicyandiamide, 648 grms. of formaldehyde 37% and 3.6 grms. of borax are mixed and heated and refluxed at 95° C. for 3½ hours.

336 grms. of dicyandiamide are added and the mixture is heated and refluxed for 9 hrs. at 90° to 95° C., the pH of the final reaction product being 9.7.

Example XIII 84 grms. of dicyandiamide are mixed with 324 grms. of formaldehyde 37% and 1.6 grms. of borax. The mixture is heated together in a flask equipped with reflux, at a temperature of 95° C. for 4 hours.

The mixture is cooled and 180 grms. of guanidine carbonate and 208 grms. water are added and the resulting mixture is heated and refluxed for 3 hrs. at 95° C., the pH of the final reaction product being about 10.0.

Example XIV 84 grms. of dicyandiamide, 324 grms. of formaldehyde 37% and 1.2 grms. of borax are mixed and heated together in a flask equipped with reflux.

The temperature is brought to 95° C. for 3 hrs., the pH at the end of the reaction being 8.5.

240 grms. of urea are added and heated and refluxed at 95° C. for 5 hrs., the pH of the final reaction product being 9.9.

Example XV 84 grms. of dicyandiamide, 162 grms. of formaldehyde 37% and 1.2 grms. of borax are mixed and heated together in a flask equipped with reflux.

The temperature is brought to 95° C., the reaction being controlled by introducing 1 cc. of the reaction liquid into a 100 cc. cold water. At the beginning of the reaction the mentioned test shows a perfectly clear solution. As the reaction progresses, and after 25 to 30 minutes the mentioned test shows a cloudy solution, at that time 120 grms. of urea are introduced and heating is continued for 2 hours at 95° C.

Subsequently, 324 grms. of CH$_2$O 37% are added and the reaction is completed by heating further for 4 hours at 95° C., and the pH of the final reaction product being 8.0.

Example XVI 84 grms. of dicyandiamide and 162 grms. of formaldehyde 37% are heated together in a flask equipped with reflux.

The temperature is brought to 95° C., the reaction being controlled by introducing 1 cc. of the reaction liquid into a 100 cc. cold water. At the beginning of the reaction the mentioned test shows a perfectly clear solution. As the reaction progresses, and after 25 to 30 minutes the mentioned test shows a cloudy solution, at that time 120 grms. of urea are introduced and heating is continued for 2 hours at 95° C.

Subsequently 162 grms. of formaldehyde 37% are added and the reaction is completed by heating further for 4 hours at 95° C., the pH of the final reaction product being 8.9.

Example XVII 180 grms. of guanidine carbonate, 243 grms. of formaldehyde 37%, 1580 grms. of the sodium salt of disulfo dinaphthyl methane in 35% water solution are heated and refluxed at 80° C. for 1 hour. 168 grms. of dicyandiamide is then added and the temperature is raised to 95° C. and refluxed for 6 hours. The pH of the final mixture is 10.5.

Example XVIII 1580 grms. of the sodium salt of disulfo dinaphthyl methane in 35% water solution are heated under reflux at 95° C. with 324 grms. of formaldehyde 37% and 84 grms. of dicyandiamide for 4 hours. 142 grms. of di-acetylene urea are then added and the mixture is then heated at 95° C. for 8 hours, the pH of the final mixture being 8.5.

Example XIX 90 grms. urea, 243 grms. formaldehyde 37% and 15 grms. borax are heated together in flask equipped with a reflux, the temperature is being brought to 80° C. for 1½ hours. 63 grms. melamine and 500 grms. of the sodium salt of disulfo dinaphthyl methane in 35% water solution are added to the above product. The product is then heated and refluxed for 4 hours at 80° C.

*Example XX*

63 grms. melamine, 243 grms. formaldehyde 37%, and 790 grms. sodium salt of disulfo dinaphthyl methane in 35% water solution are mixed and heated together in flask equipped with reflux.

The temperature is brought to 80° C. for 1 hour and 180 grms. urea are then added and the mixture is heated and refluxed at 80° C. for 4 hours.

*Example XXI*

42 grms. dicyandiamide, 162 grms. formaldehyde 37% and 500 grms. sodium salt of disulfo dihydroxy diphenyl propane in 50% water solution are mixed and heated together in a flask equipped with reflux.

The temperature is then brought to 95° C. for 4 hours. 84 grms. dicyandiamide are then added and the resulting mixture is heated and refluxed for 9 hrs. at 95° C.

*Example XXII*

84 grms. dicyandiamide, 324 grms. formaldehyde 37% and 1.8 grms. borax are mixed and heated together in a flask equipped with reflux.

The temperature is brought to 95° C. for 4 hours. 142 grms. diacetylene urea are then added and the resulting mixture is heated and refluxed for 1 hour at 95° C. To this mixture is added 1,000 grms. sodium salt of disulfo dihydroxy diphenyl sulfone in 50% water solution and the resulting mixture is heated and refluxed for 10 hours at 95° C.

*Example XXIII*

100 pounds of calf skin, chrome tanned and shaved, are put into a drum containing an aqueous washing solution and are washed for ¼ hour. The drum is drained and 13 lbs. of a mixture prepared in accordance with Example XXI is added, said mixture comprising a dicyandiamide formaldehyde resin modified by dicyandiamide and the sodium salt of disulfo dihydroxy diphenyl propane solution. Seven gallons of water are added along with the above mixture. The skins are then treated with the bath for 1 hour. ½ pound of sulfuric acid 66° Bé. is then added bringing the pH of the bath to about 3. The skins are left in the acid bath for ¼ hour during which period a water insoluble compound is precipitated on the skins. The skins are then washed for ½ hour and are fat liquored with 4 pounds of sulphonated sperm oil.

*Example XXIV*

100 pounds of calf skins, chrome tanned and shaved, are put into a drum containing an aqueous washing solution and are washed for ¼ hour. The drum is drained and 4 pounds of a modified amino-formaldehyde resin prepared in accordance with Example XII, along with 7 gallons of water, are added to the drum, said amino-formaldehyde resin being a dicyandiamide formaldehyde resin modified by dicyandiamide. The skins are treated with the resin bath for 1 hour, after which, 10 pounds of 50% solution of disulfo-dihydroxy diphenyl propane are added to the bath and the skins are left in the bath for ½ hour during which period a water insoluble compound is precipitated on the skins. The skins are then washed and fat liquored with 4 pounds of sulphonated sperm oil.

*Example XXV*

10 pounds of calf skin, chrome tanned and shaved, are put into a drum containing a washing solution and are washed for ¼ hour. The drum is drained and 12 lbs. of a mixture prepared in accordance with Example XVII is added along with 7 gallons of water, said mixture comprising a guanidine-formaldehyde resin modified by dicyandiamide and the sodium salt of disulfo-dinaphthyl methane. The skins are then treated with the bath for 1 hour, after which, ½ pound of sulfuric acid 66° Bé. is added and the skins are left in the bath for ¼ hour during which period a water insoluble compound is precipitated on the skins. The skins are then washed for ½ hour and are fat liquored with 4 pounds of sulphonated sperm oil.

*Example XXVI*

100 pounds of calf skins, chrome tanned and shaved are put into a drum containing a washing solution and are washed for ¼ hour. The drum is drained and 3 pounds of a modified amino-formaldehyde resin prepared in accordance with Example I are added along with 7 gallons of water, said resin being a guanidine-formaldehyde resin modified by dicyandiamide. The skins are then treated with the resin bath for 1 hour, after which 7 pounds of disulfo dinaphthyl methane in 35 percent water solution are added to the bath and the skins are left in the bath for ½ hour during which period a water insoluble compound is precipitated on the skins. The skins are then washed and fat liquored with 4 pounds of sulphonated sperm oil.

*Example XXVII*

100 pounds of calf skin, chrome tanned and shaved, are put into a drum containing a washing solution and are washed for ¼ hour. The drum is drained and 14 pounds of a mixture prepared in accordance with Example XVIII is added, said mixture comprising a dicyandiamide-formaldehyde resin modified by diacetylene urea and the sodium salt of disulfo dinaphthyl methane. Seven gallons of water are added along with the above mixture. The skins are then treated with the bath for 1 hour. ½ pound of sulfuric acid 66° Bé. is then added. The skins are left in the bath for ¼ hour during which period a water insoluble resinous compound is precipitated on the skins. The skins are then washed and are fat liquored with 4 pounds sulphonated sperm oil.

*Example XXVIII*

100 pounds of calf skins, chrome tanned and shaved, are put into a drum containing a washing solution and are washed for ¼ hour. The drum is drained and 3 pounds of a modified amino-formaldehyde resin prepared in accordance with Example XI along with 7 gallons of water are added to the drum, said resin being a dicyandiamide-formaldehyde resin modified by diacetylene urea. The skins are treated with the resin bath for 1 hour, after which 6 pounds of disulfo-dinaphthyl methane are added to the bath and the skins are left in the bath for ½ hour during which period a water soluble compound is precipitated on the skins. The skins are then washed and fat liquored with 4 pounds sulphonated sperm oil.

*Example XXIX*

100 pounds of calf skins, chrome tanned and shaved, are put into a washing solution and are washed for ¼ hour. The drum is drained and 12 lbs. of a mixture prepared in accordance with Example XIX is added, said mixture comprising a urea-formaldehyde resin modified by melamine and the sodium salt of disulfo dinaphthyl methane in 35% water solution. Seven gallons of water are added along with the above mixture. The skins are then treated with the bath for 1 hour. ½ pound of sulfuric acid 66° Bé. is then added and the skins are left in the bath for ¼ hour during which period a water insoluble compound is precipitated on the skins. The skins are then washed for ½ hour and are fat liquored with 4 pounds of sulphonated sperm oil.

*Example XXX*

100 pounds of calf skin, chrome tanned and shaved, are put into a drum containing a washing solution and are washed for ¼ hour. The drum is drained and 13 pounds of a mixture prepared in accordance with Example XX is added, said mixture comprising a melamine-formaldehyde resin modified by urea and the sodium salt of disulfo dinaphthyl methane in 35% water solution. Seven gallons of water are added along with the above mixture. The skins are then treated with the bath for 1 hour. ½ pound of sulfuric acid then added and the skins are left in the acid bath for ¼ hour during which period a water insoluble compound precipitated on the skins. The skins are washed for ½ hour and are fat liquored with 4 pounds sulphonated sperm oil.

*Example XXXI*

100 pounds of calf skin, chrome tanned and shaved, are put into a drum containing a washing solution and are washed for ¼ hour. The drum is drained and 13 lbs. of a mixture prepared in accordance with Example XXII is added, said mixture comprising a dicyandiamide-formaldehyde resin modified by diacetylene urea and the sodium salt of disulfo dihydroxy diphenyl sulfonate in 50% water solution. Seven gallons of water are added along with the above mixture. The skins are then treated with the bath for 1 hour. ½ pound of sulfuric acid 66° Bé. is then added and the skins are left in the bath for ¼ hour during which period a water insoluble compound is precipitated on the skins. The skins are then washed for ½ hour and are fat liquored with 4 pounds of sulfonated sperm oil.

*Example XXXII*

100 pounds of calf skin, chrome tanned and shaved, are put into a drum containing a washing solution and are washed for ¼ hour. The drum is drained and 3 pounds of a modified amino-formaldehyde resin prepared in accordance with Example XIV, along with 7 gallons of water, are added to the drum, said resin being a dicyandiamide-formaldehyde resin modified by diacetylene urea. The skins are treated with the resin bath for 1 hour, after which, 7 pounds of disulfo-dihydroxy, diphenyl sulfone are added to the bath and the skins are left in the bath for ½ hour during which period a water insoluble compound is precipitated on the skins. The skins are then washed and fat liquored with 4 pounds of sulphonated sperm oil.

*Example XXXIII*

100 pounds of calf skin, chrome tanned and shaved, are put into a drum containing an aqueous washing solution and are washed for ¼ hour. The drum is drained and 9 lbs. of the sodium salt disulfo-dihydroxy diphenyl propane along with 7 gallons of water are added to the drum, and the skins are treated with this composition for ¼ hour. 4 pounds of a modified amino-formaldehyde resin prepared in accordance with Example XII are then added to the drum bath and the skins are treated with the bath for 1 hour. ½ pound of sulfuric acid is then added to the bath and the skins are left in the acid bath for ¼ hour during which period a water insoluble compound is precipitated on the skins. The skins are then washed for ½ hour and are fat liquored with 4 pounds of sulphonated sperm oil.

*Example XXXIV*

100 pounds of calf skin, chrome tanned and shaved, are put into a drum containing an aqueous washing solution and are washed for ¼ hour. The drum is drained and 9 lbs. of the sodium salt disulfo-dinaphthyl methane along with 7 gallons of water are added to the drum, and the skins are treated with this composition for ¼ hour. 4 pounds of a modified amino-formaldehyde resin prepared in accordance with Example I are then added to the drum bath and the skins are treated with the bath for 1 hour. ½ pound of sulfuric acid is then added to the bath and the skins are left in the acid bath for ¼ hour during which period a water insoluble compound is precipitated on the skins. The skins are then washed for ½ hour and are fat liquored with 4 pounds of sulphonated sperm oil.

The treated leather products obtained by the process disclosed in the above Examples XXIII to XXXVIII have increased tensile strength, increased resistance to cracking, increased resistance to abrasion and have an increased flexibility than prior to treatment. Other materials which may be treated by this process are paper, fabrics, woodwork, etc. wherein the water insoluble compound precipitated on the object being treated acts as a filler, modifying agent, etc.

The invention in its broader aspects is not limited to the specific steps and compositions described but departures may be made therefrom within the scope of the accompanying claims without departing from the principles of the invention and without sacrificing its chief advantages.

I claim:

1. A process for the preparation of a modified amino-formaldehyde resin having cationic active properties and which is stable in water and will not heat polymerize or condense therein, comprising reacting at a temperature in the range of about 75° C. to about 110° C. (a) a water-soluble, amino-formaldehyde resin containing free unreacted methylol groups which impart instability to said amino-formaldehyde resin in water, said amino-formaldehyde resin being selected from the group consisting of urea-formaldehyde resins, thiourea-formaldehyde resins, guanidine-formaldehyde resins, acetylene diurea-formaldehyde resins, melamine-formaldehyde resins and dicyandiamide-formaldehyde resins with (b) a water-soluble amino base selected from the group consisting of urea, thiourea, guanidine, acetylene diurea, melamine and dicyandiamide, the water-soluble amino base being in an amount sufficient to react with all of the methylol groups of the amino-formaldehyde resin, said reaction being carried out at a pH of about at least 7.

2. A modified amino-formaldehyde resin prepared in accordance with claim 1.

3. A process according to claim 1 wherein the amino-formaldehyde resin is a urea-formaldehyde resin.

4. A process according to claim 1 wherein the amino-formaldehyde resin is a thiourea-formaldehyde resin.

5. A process according to claim 1 wherein the amino-formaldehyde resin is a guanidine-formaldehyde resin.

6. A process according to claim 1 wherein the amino-formaldehyde resin is an acetylene-formaldehyde resin.

7. A process according to claim 1 wherein the amino-formaldehyde resin is a melamine-formaldehyde resin.

8. A process according to claim 1 wherein the amino-formaldehyde resin is a dicyandiamide-formaldehyde resin.

9. A process according to claim 1 wherein the amino base is urea.

10. A process according to claim 1 wherein the amino base is thiourea.

11. A process according to claim 1 wherein the amino base is guanidine.

12. A process according to claim 1 wherein the amino base is acetylene diurea.

13. A process according to claim 1 wherein the amino base is melamine.

14. A process according to claim 1 wherein the amino base is dicyandiamide.

15. A modified amino-formaldehyde resin prepared in accordance with the process of claim 3.

16. A modified amino-formaldehyde resin prepared in accordance with the process of claim 4.

17. A modified amino-formaldehyde resin prepared in accordance with the process of claim 5.

18. A modified amino-formaldehyde resin prepared in accordance with the process of claim 6.

19. A modified amino-formaldehyde resin prepared in accordance with the process of claim 7.

20. A modified amino-formaldehyde resin prepared in accordance with the process of claim 8.

21. A modified amino-formaldehyde resin prepared in accordance with the process of claim 9.

22. A modified amino-formaldehyde resin prepared in accordance with the process of claim 10.

23. A modified amino-formaldehyde resin prepared in accordance with the process of claim 11.

24. A modified amino-formaldehyde resin prepared in accordance with the process of claim 12.

25. A modified amino-formaldehyde resin prepared in accordance with the process of claim 13.

26. A modified amino-formaldehyde resin prepared in accordance with the process of claim 14.

References Cited in the file of this patent

UNITED STATES PATENTS

| | | |
|---|---|---|
| 1,482,796 | Dearing | Dec. 4, 1934 |
| 2,016,285 | Kraus | Oct. 8, 1935 |
| 2,016,595 | Dearing | Oct. 8, 1935 |
| 2,022,233 | Ellis | Nov. 26, 1935 |
| 2,197,357 | Widmer et al. | Apr. 16, 1940 |
| 2,286,228 | Ripper | June 16, 1942 |
| 2,317,181 | D'Alelio | Apr. 20, 1943 |
| 2,328,424 | D'Alelio | Aug. 31, 1943 |
| 2,368,451 | D'Alelio | Jan. 30, 1945 |
| 2,369,613 | Schubert et al. | Feb. 13, 1945 |
| 2,378,362 | Ripper | June 12, 1945 |
| 2,476,939 | Wise | July 19, 1949 |
| 2,512,672 | Novotny et al. | June 27, 1950 |

UNITED STATES PATENT OFFICE

CERTIFICATE OF CORRECTION

Patent No. 2,944,046            July 5, 1960

Lucien Sellet

It is hereby certified that error appears in the above numbered patent requiring correction and that the said Letters Patent should read as corrected below.

Column 9, line 21, for "sulfonate" read -- sulfone --.

Signed and sealed this 24th day of October 1961.

(SEAL)
Attest:

ERNEST W. SWIDER
Attesting Officer

DAVID L. LADD
Commissioner of Patents

USCOMM-DC